US005908687A

United States Patent [19]

Mori

[11] Patent Number: 5,908,687

[45] Date of Patent: Jun. 1, 1999

[54] HEAT-SENSITIVE STENCIL AND METHOD OF FABRICATING SAME

[75] Inventor: Tomiya Mori, Kakuda, Japan

[73] Assignee: Tohoku Ricoh Co., Ltd., Miyagi-ken, Japan

[21] Appl. No.: 08/919,291

[22] Filed: Aug. 28, 1997

[30] Foreign Application Priority Data

| | | | |
|---|---|---|---|
| Dec. 16, 1996 | [JP] | Japan | 8-353249 |
| Apr. 17, 1997 | [JP] | Japan | 9-115300 |

[51] Int. Cl.[6] B05C 17/06; B32B 3/26; B32B 5/08; B41N 1/24

[52] U.S. Cl. 428/215; 101/128.21; 427/143; 427/255.4; 427/411; 428/314.2; 428/317.9; 428/319.7; 428/903; 428/913

[58] Field of Search 428/314.2, 317.9, 428/319.7, 215, 903, 913; 101/128.21; 427/143, 255.4, 411

[56] References Cited

U.S. PATENT DOCUMENTS

| | | | |
|---|---|---|---|
| 4,163,824 | 8/1979 | Saidla | 428/313 |
| 5,458,915 | 10/1995 | Yamamoto | 427/143 |
| 5,534,099 | 7/1996 | Yamamoto | 156/230 |
| 5,558,931 | 9/1996 | Biggs et al. | 428/218 |

FOREIGN PATENT DOCUMENTS

| | | |
|---|---|---|
| 62-149496 | 7/1987 | Japan . |
| 62-198459 | 9/1987 | Japan . |
| 62-282983 | 12/1987 | Japan . |
| 2-158391 | 6/1990 | Japan . |
| 3-193445 | 8/1991 | Japan . |
| 4-7198 | 1/1992 | Japan . |
| 5-70595 | 10/1993 | Japan . |

*Primary Examiner*—James J. Bell
*Assistant Examiner*—Blaine R. Copenheaver
*Attorney, Agent, or Firm*—Oblon, Spivak, McClelland, Maier & Neustadt, P.C.

[57] ABSTRACT

A heat-sensitive stencil including a thermoplastic resin film, and a porous resin layer formed thereon. The porous resin layer contains fibers having an average length in the range of 30 μm to 10 mm. The stencil is produced by applying a coating liquid over a surface of a thermoplastic resin film to form a coated layer, and drying the coated layer. The coating liquid has a viscosity of 80–250 cp at 25° C. and contains a resin and fibers having an average length in the range of 30 μm to 10 mm.

11 Claims, 3 Drawing Sheets

HEAT-SENSITIVE STENCIL AND METHOD OF FABRICATING SAME

BACKGROUND OF THE INVENTION

This invention relates to a heat-sensitive stencil and to a method of fabricating same.

One known heat-sensitive stencil is composed of an ink-permeable thin paper serving as an ink support and a thermoplastic resin film bonded with an adhesive to the support. The stencil is heated imagewise by, for example, a thermal head to perforate the heated portions of the thermoplastic resin film, thereby obtaining a printing master for reproducing images by mimeographic printing. The conventional stencil, however, poses problems because (1) the adhesive tends to be accumulated in interstices between fibers to form "fins" which prevent the thermal perforation during the master forming step and the passage of an ink during the printing step, (2) the fibers per se prevent smooth passage of an ink and (3) the paper support is relatively expensive.

To cope with the above problems, JP-A-54-33117 proposes a stencil having no paper support and composed substantially only of a thermoplastic resin film. While this stencil can completely solve the above-mentioned problems, a new serious problem arises; i.e. it is necessary to significantly increase the thickness of the stencil in order to obtain satisfactory stiffness required for transferring the stencil master during printing stage. An increase of the thickness results in the lowering of the thermal sensitivity.

JP-A 62-198459 discloses a method of fabricating a stencil wherein a multiplicity of closed patterns such as circular patterns are formed by gravure printing of a radiation-curable heat-resisting resin on a thermoplastic resin film, followed by curing. Since this method unavoidably gives patterns have a thickness of 50 μm or more, the formation of perforations with a thermal head is not easy. Further, ink stains are apt to be formed on prints obtained using such a stencil master.

SUMMARY OF THE INVENTION

It is, therefore, an object of the present invention to provide a heat-sensitive stencil having satisfactory stiffness and excellent sensitivity to thermal perforation.

Another object of the present invention is to provide a heat-sensitive stencil without an adhesive and paper.

It is a further object of the present invention to provide a heat-sensitive stencil which has a high tensile strength and high resistance to elongation and breakage.

It is a further object of the present invention to provide a heat-sensitive stencil of the above-mentioned type which can give a printing master capable of producing uniform, clear printings even with a small amount of an ink.

It is yet a further object of the present invention to provide a heat-sensitive stencil of the above-mentioned type which can give a printing master capable of producing printed images free of ink blurs and stains.

It is a still further object of the present invention to provide a method which can easily fabricate a heat-sensitive stencil.

In accomplishing the foregoing objects, there is provided in accordance with one aspect of the present invention a heat-sensitive stencil comprising a thermoplastic resin film, and a porous resin layer formed thereon, said porous resin layer containing fibers having an average length in the range of 30 μm to 10 mm.

The provision of the porous resin layer containing fibers having an average length in the range of 30 μm to 10 mm can impart satisfactory stiffness to the stencil without adversely affecting the sensitivity to perforation thereof.

In another aspect, the present invention provides a method of preparing a heat-sensitive stencil, comprising the steps of:

applying a foamable coating liquid over a surface of a thermoplastic resin film to form a coated layer, said coating liquid having a viscosity of 80–250 cp at 25° C. and containing a resin and fibers having an average length in the range of 30 μm to 10 mm; and drying said coated layer.

BRIEF DESCRIPTION OF THE DRAWINGS

Other objects, features and advantages of the present invention will become apparent from the detailed description of the preferred embodiments of the invention which follows, when considered in light of the accompanying drawings, in which.

DETAILED DESCRIPTION OF THE PREFERRED EMBODIMENTS OF THE INVENTION

Figure 1:
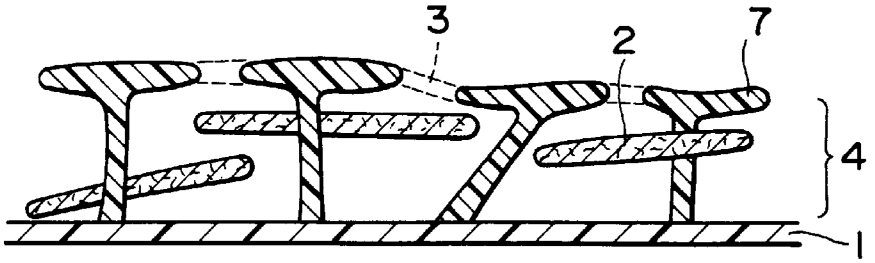
FIG. 1 is a sectional view schematically illustrating an embodiment of a heat-sensitive stencil according to the present invention.

FIG. 1 is a sectional view schematically illustrating one embodiment of a stencil according to the present invention. Designated as 1 is a thermoplastic resin film on which a porous resin layer 4 containing a filler 2 and having cells defined by resin walls 7 is formed.

The filler 2 used in the present invention is in the form of fibers having an average length in the range of 30 μm to 10 mm. The fibers may be, for example, natural fibers such as animal or plant fibers, mineral fibers, glass fibers, carbon fibers, metal fibers, synthetic polymer fibers or silica fibers. It is important that the fibers should have an average length of at least 30 μm in order to ensure satisfactory tensile strength and stiffness of the stencil. Too large an average length over 10 mm should be avoided since the fibers not uniformly dispersed in the porous resin layer 4. The average length of the fibers is preferably 30 μm to 7 mm.

It is preferred that the fibers have an average diameter of at least 4 μm for reasons of improved tensile strength. The average diameter of the fibers is preferably not greater than 20 μm, more preferably not greater than 16 μm.

Figure 2:
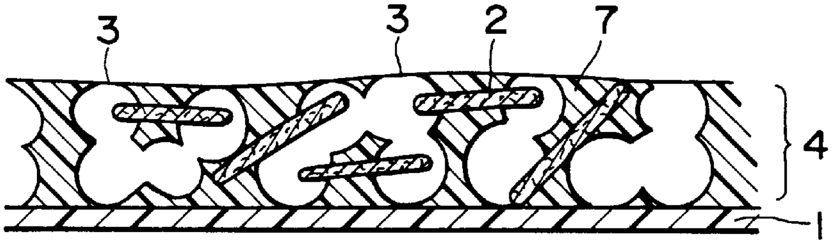
FIG. 2 is a sectional view schematically illustrating another embodiment of a heat-sensitive stencil according to the present invention.
Figure 3:
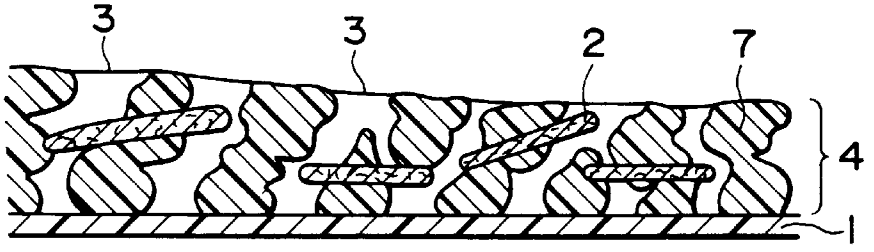
FIG. 3 is a sectional view schematically illustrating a further embodiment of a heat-sensitive stencil according to the present invention.
Figure 4:
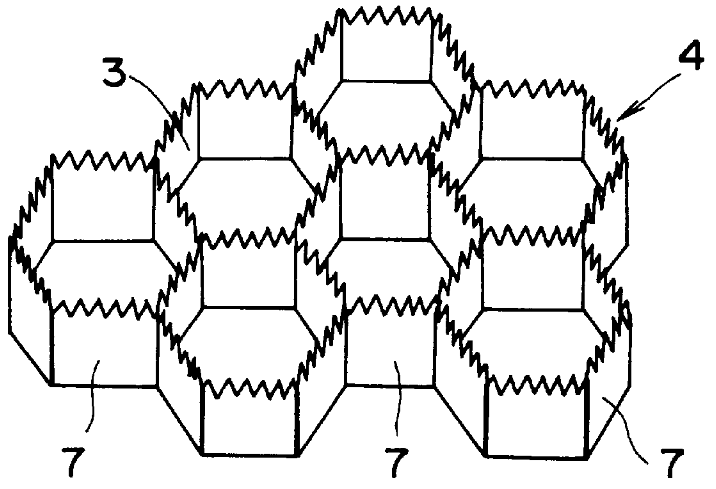
FIG. 4 is a perspective view schematically illustrating a further embodiment of a heat-sensitive stencil according to the present invention.

The porous layer 4 may have any cell structure as long as an ink is permeable therethrough in the thickness direction thereof. Thus, majority of the cells have an open cellular structure. Preferably, the cells at the surface of the layer 4 open to form openings 3. The resin walls 7 of adjacent cells are preferably connected to each other so that the stencil as a whole has improved tensile strength and stiffness. Examples of cell structures of the porous resin layer 4 are schematically illustrated FIGS. 2–4, in which the same reference numerals as those in FIG. 1 designate similar component parts. In FIG. 4, the filler is not shown for reasons of simplicity.

It is preferred that the total area S1 of the openings of the porous resin layer 4 having an equivalent diameter of at least 5 μm, preferably 5–50 μm, be 4–80%, more preferably 10–60%, of a total area SA of the surface of the porous resin layer 4 for reasons of proper ink passage therethrough and proper capability of the formation of perforations. The term “openings” herein refers to cells exposed to a surface of the layer 4 and the term “equivalent diameter” refers to a diameter of a circle having the same area as that of the corresponding “opening”. The total area of the openings may be measured from an electron microphotograph (magnification: 1,000) of the surface of the porous layer 4. The photograph is processed by an image processor (LA-555D manufactured by Pierce Inc.) for determining the diameter of the circle corresponding to the opening.

It is also preferred that the total area of the openings having an equivalent diameter of at least 5 μm, preferably 5–50 μm, is at least 50%, preferably at least 70%, of a total area SP of the openings for reasons of proper ink passage therethrough and proper capability of the formation of perforations.

The porous resin layer 4 preferably has a thickness of 5–100 μm, more preferably 6–50 μm, for reasons of proper stiffness of the stencil and proper ink transference. The density of the porous resin layer 4 is preferably 0.01–1 $g/cm^3$, more preferably 0.1–0.5 $g/cm^3$, for reasons of proper stiffness and mechanical strengths. For reasons of proper strength and ink transference, the porous resin layer 4 is provided over the thermoplastic resin film 1 in an amount of 0.5–25 $g/m^2$, more preferably 2–15 $g/m^2$. The porous layer 4 preferably has an average cell diameter of 1–50 μm, more preferably 2–30 μm, for reasons of proper ink permeability.

For reasons of proper transferability of the printing master in the printer, it is preferred that the stencil has a flexural rigidity of at least 5 mN, more preferably 10–200 mN, when measured with a Lorentzen Stiffness Tester.

It is also preferred that the stencil show an air permeability in the range of 1.0 $cm^3/cm^2$.sec to 157 $cm^3/cm^2$.sec, preferably 10 $cm^3/cm^2$.sec to 80 $cm^3/cm^2$.sec, in a portion thereof when the thermoplastic resin film of that portion is perforated to form perforations providing an open ratio $S_O/S_P$ of at least 0.2, wherein $S_O$ represents a total area of the perforations and $S_P$ represents the area of the portion.

The air permeability may be measured in the following manner. A square solid pattern (black pattern) with a size of 10×10 cm is read by a printer (PRIPORT VT 3820 manufactured by Ricoh Company, Ltd.) and a sample stencil is perforated with a thermal head in accordance with the read out pattern to form a printing master. The perforation operations are performed for five similar samples so that five printing masters having open ratios $S_O/S_P$ of about 0.2, 0.35, 0.50, 0.65 and 0.80 are obtained. The open ratio of a master may be measured by making a photomicrograph (magnification: 100) thereof. The photomicrograph is then magnification-copied (magnifying ratio: 200) using a copying machine (IMAGIO MF530 manufactured by Ricoh Company, Ltd.). Perforations shown in the copy are marked on an OHP film and then read by a scanner (300 DPI, 256 gradient). This is binarized with an image retouch software Adobe Photoshop 2.5J. The open ratio of the perforations is measured using an image analysis software NIH IMAGE. The perforated portion of each of the printing masters is measured for the air permeability thereof by any conventional method. When at least one of the five masters has an air permeability in the range of 1.0 $cm^3/cm^2$.sec to 157 $cm^3/cm^2$.sec, the stencil is regarded as falling within the scope of the present invention.

Any resin may be used for the formation of the porous layer 4. Illustrative of suitable resins of the porous layer 4 are a vinyl resin such as a styrene resin, poly(vinyl chloride), poly(vinylidene chloride), poly(vinyl alcohol), poly(vinyl butyral), poly(vinyl acetate), poly(vinyl acetal), vinyl chloride-vinyl acetate copolymer, vinyl chloride-vinylidene chloride copolymer, styrene-acrylonitrile copolymer or vinyl chloride-acrylonitrile copolymer; a polyamide such as nylon; a polyolefin such as polyethylene, polypropylene or polybutylene; polyphenylene oxide; a polyamide; a polyester; a (meth)acrylic ester; polycarbonate; a polyacetal; a fluorine resin; a polyurethane; a natural resin; a thermoplastic elastomer or a cellulose derivative such as acetylcellulose, acetylbutylcellulose or acetylpropylcellulose. These resins may be used singly or in combination of two or more. It is preferred that the porous resin layer 4 contain a resin capable of softening at a temperature at which the perforation by a thermal head is carried out, generally at a temperature of 150° C. or less, for reasons of facilitating the perforation of the thermoplastic resin film 1.

The porous resin layer 4 can contain one or more additives such as an antistatic agent, a stick-preventing agent, a surfactant, an antiseptic agent, an organic or inorganic pigment, a foam-stabilizing agent and an antifoaming agent.

The inorganic pigment may be, for example, zinc oxide, titanium oxide, calcium carbonate and silica. The organic pigment may be, for example, particles of polyvinyl acetate, polyvinyl chloride or polymethyl acrylate. The pigment has a function to control the shape, strength and cell diameter of the porous resin layer 4.

The surfactant may be anionic, cationic, nonionic or ampholytic surfactant and is used for the formation of foams. The use of anionic surfactant such as a sulfuric acid ester of a higher alcohol for reasons of good foam-forming property and foam-stabilizing property. The surfactant is generally used in an amount of 0.001–0.1% by weight based on the weight of water.

The foam-stabilizing agent may be, for example, egg white, sapdnin or gelatin.

Any thermoplastic resin conventionally used in heat-sensitive stencil master may be used for the film 1. Illustrative of suitable thermoplastic resins are vinyl chloride-vinylidene chloride copolymers, polypropylene and polyesters. A polyester film having melting energy of 3–11 cal/g (JP-A-62-149496), a polyester film having a degree of crystallization of 30% or less (JP-A-62-282983) and a polyester film containing at least 50 mol % of butylene terephthalate units (JP-A-2-158391) are particularly preferred because they permit perforation with a low energy. The thermoplastic resin film 1 preferably has a thickness of 0.5–10 μm, more preferably 1–7 μm for reasons of easiness in formation of the porous layer 4 thereon and in formation of perforations.

If desired, the thermoplastic resin layer 1 may be backed by a stick preventing layer (not shown) containing a stick preventing agent such as a silicone mold release agent, a fluorine resin mold release agent or a phosphoric ester surfactant.

Figure 5:
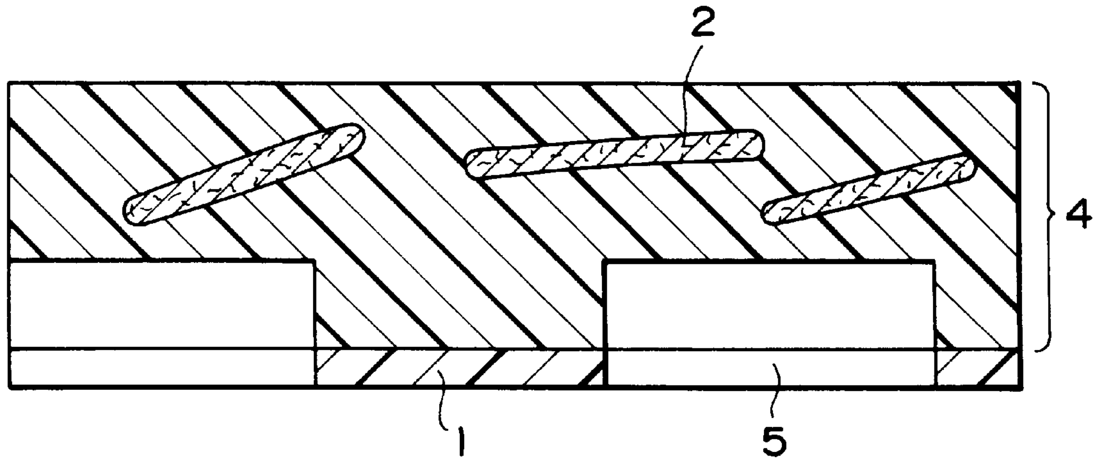
FIG. 5 is a sectional view schematically illustrating a state of a heat-sensitive stencil according to the present invention where perforations have been formed.

FIG. 5 schematically illustrates the state where the stencil has been processed by a thermal head to form perforations 5. In FIG. 5, the same reference numerals as those in FIG. 1 designate similar component parts. For reasons of simplicity, the cell structure of the porous resin layer 4 is not shown. In the illustrated case, the thermoplastic resin layer 1 is perforated with part of the porous resin layer 4 in each of the perforations 5 remaining unremoved and covering the perforations 5. The remaining portion of the porous resin layer 4 serves to control the amount of ink transferred from the master to a paper during the mimeographic printing stage. Such remaining portion of the layer 4 can be formed by suitably adjusting the thickness of the layer 4.

One preferred process (first embodiment) of fabricating the heat-sensitive stencil includes applying a foamable or foamed coating liquid over a surface of a thermoplastic resin film 1 to form a coated layer. The coated layer is then dried, preferably at a temperature not exceeding 60° C., to obtain a porous resin layer 4 formed over the film 1. The coating liquid has a viscosity of 80–250 cp at 25° C. and contains a resin and fibers having an average length in the range of 30 $\mu$m to 10 mm.

More specifically, the porous resin layer 4 may be formed by the following methods:

(a) A foamed coating liquid (preferably aqueous liquid) is applied to a thermoplastic resin film 1 and then dried. The foams may be produced by merely mixing or agitating a coating liquid preferably containing a surfactant. Alternately, foams may be formed by using chemical reaction, for example, between sodium hydrogen carbonate and an tartaric acid or between aluminum sulfate and sodium hydrogen carbonate. If desired, the reactant may be encapsulated.

(b) A solid, such as a wax or polyethylene glycol, which becomes fluid at a temperature of above 50° C. is incorporated into the coating liquid. The coating liquid is then foamed by the above method (a) at a temperature sufficient to fluidize the solid, applied to the film 1, cooled to solidified the solid and then dried.

(c) A foaming agent capable of generating a gas, such as nitrogen, carbon dioxide, steam, oxygen or hydrogen, upon energized by heat, light, electromagnetic wave, electric energy or radioactive rays, is incorporated into the coating liquid. The coating liquid is foamed before or after being applied to the film 1. Examples of the foaming agent include dry ice (generating carbon dioxide when heated) and diazo compounds (generating nitrogen when irradiated with light).

(d) Two or more reactants capable of reacting with each other to generate a gas are used. One of the reactants (e.g. sodium hydrogen carbonate) is incorporated into the coating liquid. The coating liquid is applied to the film 1 and dried. A liquid containing the other reactant or reactants (e.g. tartaric acid or aluminum sulfate) is then applied to the dried layer to cause the foam forming reaction to occur. The resulting layer is then dried to obtain the porous layer 4.

(e) A gas such as air is dissolved in the coating liquid under pressure. The coating liquid is applied at ambient pressure and then dried to obtain the porous layer 4.

In the above methods (a)–(e), when the cells of the porous layer 4 are closed, it is advisable to rub or abrade the surface of the layer 4 to open the closed cells.

Another process (second embodiment) of fabricating the heat-sensitive stencil will be next described. First, a solution of a resin for the porous resin layer in a first solvent (good solvent) capable of dissolving the resin is prepared. The solution is applied over a surface of a thermoplastic resin film to form a wet resin coating over the surface. Then, vapors or fine droplets of a second solvent (poor solvent) substantially incapable of dissolving the resin are sprayed over the wet resin coating so that the second solvent is taken into the wet resin coating to cause a portion of the resin to precipitate. Thereafter, the resin coating is heated to dryness. In the second embodiment, the size and number of cells may be controlled by the amount and particle size of the droplets of the second solvent.

A part of the second solvent may be suitably previously incorporated into resin solution in the first solvent to obtain porous resin layer having a uniform cell diameter. It is also preferred that the thermoplastic resin film be previously applied with a spray of the second solvent before being applied with the solvent solution of the resin, since the contact area between the resulting porous resin layer and the thermoplastic resin film is decreased and, therefore, the stencil can be more easily perforated by a thermal head. Preferably, the second solvent has a boiling point which is higher by 10–40° C. than that of the first solvent and which is preferably 100° C. or less.

Examples of suitable poor and good solvents are shown in Table 1 below. As shown, good and poor solvents vary with the resin to be dissolved.

TABLE 1

| | Resin | | | | | |
|---|---|---|---|---|---|---|
| Solvent(b.p. ° C.) | PVC*1 | VCA*2 | PB*3 | PS*4 | ANS*5 | ABS*6 |
| Methanol(64.5) | poor | poor | poor | poor | poor | poor |
| Ethanol(78.3) | poor | poor | poor | — | — | poor |
| Ethyl acetate (77.1) | — | good | poor | good | good | — |
| Acetone(56.5) | good | good | poor | good | good | good |
| Methyl ethyl ketone(79.6) | good | good | poor | good | good | good |
| Diethyl ether (34.5) | poor | — | — | poor | poor | poor |
| Tetrahydrofuran (65–67) | good | good | good | good | — | — |
| Hexane(68.7) | poor | poor | good | poor | poor | — |
| Heptane(98.4) | poor | poor | poor | poor | poor | poor |
| Benzene(80.1) | — | poor | good | good | good | good |
| Toluene(110.6) | — | good | good | good | good | good |
| Xylene(139.1) | — | good | good | good | good | good |
| Chloroform(61.2) | — | good | good | good | good | good |
| Carbon tetra-chloride(76.7) | — | good | good | good | — | — |
| Water(100.0) | poor | poor | poor | poor | poor | poor |

| | Resin | | | | | |
|---|---|---|---|---|---|---|
| Solvent(b.p. ° C.) | MAR*7 | PVA*8 | PC*9 | AC*10 | AR*11 | VB*12 |
| Methanol(64.5) | — | good | poor | — | poor | good |
| Ethanol(78.3) | — | poor | poor | — | poor | good |
| Ethyl acetate (77.1) | good | good | poor | good | good | good |
| Acetone(56.5) | good | good | poor | good | good | good |
| Methyl ethyl ketone(79.6) | good | good | poor | good | — | good |
| Diethyl ether (34.5) | — | poor | — | — | — | poor |
| Tetrahydrofuran (65–67) | good | — | good | good | — | good |
| Hexane(68.7) | poor | poor | poor | poor | poor | poor |
| Heptane(98.4) | poor | poor | poor | poor | poor | poor |
| Benzene(80.1) | good | good | good | — | good | poor |
| Toluene(110.6) | good | good | good | poor | good | poor |
| Xylene(139.1) | good | good | good | poor | good | — |
| Chloroform(61.2) | good | good | good | good | good | — |
| Carbon tetra-chloride(76.7) | — | — | good | poor | — | — |
| Water(100.0) | poor | poor | poor | poor | poor | poor |

*1 PVC: poly(vinyl chloride)
*2 VCA: vinyl chloride-vinyl acetate copolymer
*3 PB: polybutylene
*4 PS: polystyrene
*5 ANS: acrylonitrile-styrene copolymer
*6 ABS: acrylonitrile-butadiene-styrene copolymer
*7 MAR: methacrylic acid resin
*8 PVA: poly(vinyl acetate)
*9 PC: polycarbonate
*10 AC: acetylcellulose resin
*11 AR: acrylate resin
*12 VB: polyvinyl-butyral A further process (third embodiment) for preparing the heat-sensitive stencil according to the present invention will be described next. A resin for forming the porous resin layer 4 is first dissolved, completely or partly, in a mixed solvent including a first solvent (good solvent) capable of dissolving the resin and a second solvent (poor solvent) substantially incapable of dissolving the resin and having a lower evaporation rate than the first solvent, thereby to obtain a coating liquid in the form of a solution or a dispersion. Preferably the second solvent has a boiling point which is higher by 10–40° C. than that of the first solvent and which is preferably 100° C. or less.

The concentration of the resin in the mixed solvent solution is generally 2–50% by weight, preferably 5–30% by weight. The weight ratio of the first solvent to the second solvent, which has an influence upon the cell structure of the porous resin layer 4, is generally 40:60 to 95:5. Examples of the first and second solvents include those described above.

The thus obtained coating liquid is then applied over a surface of a thermoplastic resin film to form a wet resin coating. The wet resin coating is then heated at a temperature below the boiling point of the second solvent but sufficient to vaporize part of the first solvent so that a portion of the resin precipitates. Subsequently, the coating is further heated preferably at 80° C. or less until the coating is completely dried. During the course of the vaporization of the solvents, there are formed a multiplicity of cells.

In the above first to third processes, the application of the coating liquid may be carried out by any desired coating method such as blade coating, transfer roll coating, wire bar coating, air doctor coating, die coating, reverse roll coating or gravure coating. The coating liquid preferably has a viscosity of 80–250 cp at 25° C. for reasons of proper dispersion of the fibrous filler and proper fluidity. If desired, a viscosity controlling agent such as carboxymethyl cellulose, polyvinyl alcohol, glycerin or sodium arginate may be used.

Figure 6:
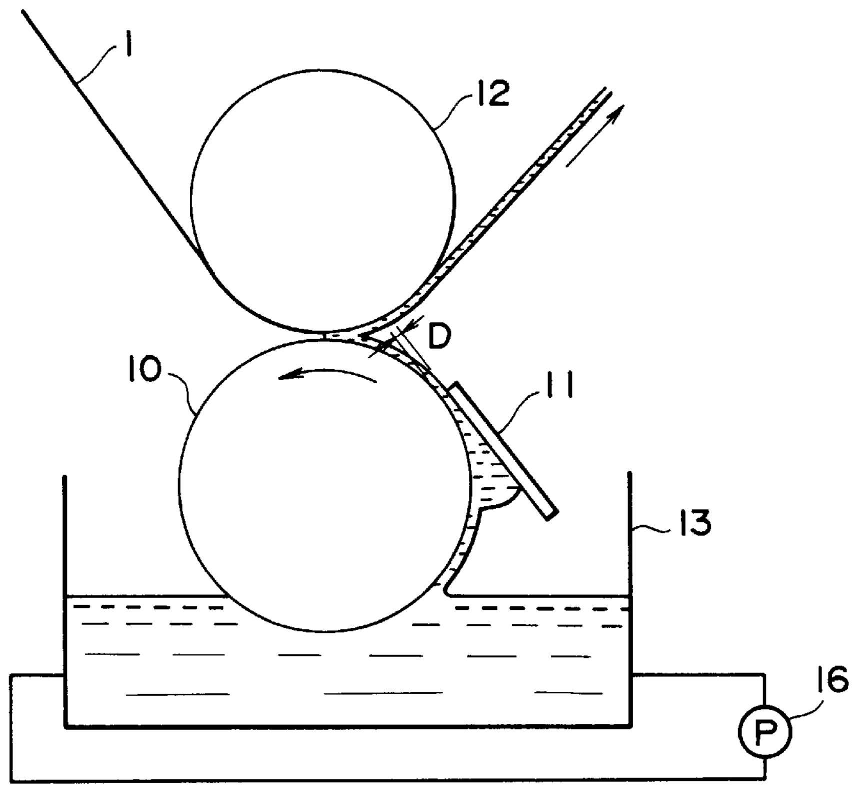
FIG. 6 is an elevational cross-sectional view diagrammatically illustrating a roll coating device.

In the above-described first to third processes, it is preferable to adopt the following coating method. Referring to FIG. 6, designated as 10 is a pickup roll having a lower portion dipped in a coating liquid contained in a bat 13. The coating liquid is maintained in flowing state by the recirculating pump 16. The flow rate of the coating liquid through the pump 16 is preferably at least V per minute, more preferably at least 2V per minute, where V is the volume of the coating liquid in the bat 13 for reasons of maintaining uniform dispersion of the fiber filler in the coating liquid.

Disposed above the pickup roll 10 is a backup roll 12 to form a coating nip therebetween. A thermoplastic film 1 is continuously fed to the coating nip by rotation of the backup roll 12 in the counter-clockwise direction in FIG. 6. The coating liquid is "picked up" by the pickup roll 10 rotating in the clockwise direction, so that a liquid film is formed on the surface of the pickup roll 10. The liquid film is continuously supplied to the coating nip between the pickup and backup rolls 10 and 12. As a consequence, the coating liquid is successively applied onto the thermoplastic film 1.

Figure 7:
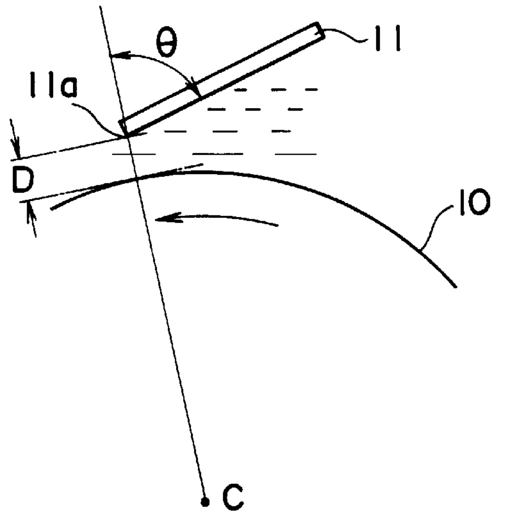
FIG. 7 is a fragmentary, enlarged sectional view schematically illustrating the orientation of a blade of the coating device of FIG. 6.

The reference numeral 11 designates a blade disposed adjacent the pickup roll 10 for adjusting the thickness of the liquid film fed to the coating nip. The gap D between the tip 11*a* of the blade 11 and the surface of the pickup roll 10 should be at least twice the diameter of the fibrous filler but not greater than 1 mm in order to prevent the clogging of the gap D with the filler. It is also important that the blade 11 should be oriented such that, as shown in FIG. 7, the angle 0 between the inside surface of the blade 11 and the radial plane passing the center axis C of the pickup roll 10 and the tip 11*a* of the blade 11 is in the range of 45 to 90 degrees, in order to prevent the clogging of the gap D with the filler and to maintain uniform dispersion of the filler in the liquid film. The angle θ is preferably in the range of 60 to 90 degrees.

The following examples will further illustrate the present invention. Parts are by weight.

EXAMPLE 1

Cellulose acetate butylate 5 parts
Methyl ethyl ketone (b.p. 79.6° C.) 75 parts
Water 5 parts
Methanol (b.p. 64.5° C.) 5 parts
Carbon fiber (diameter: 20 μm, average length: 30 μm) 10 parts The above composition was stirred to dissolve the resin in the solvent and allowed to quiescently stand to remove foams. The dispersion was then uniformly applied to a biaxially stretched polyester film (thickness: 3.5 μm) with a roll coater at a temperature of 30° C. and a relative humidity of 50% with a coating rate of 10 m/minute, thereby to form a wet coating. The coating was allowed to stand as such for 1 minute and then placed in a drying chamber at 50° C. for 2 minutes to dry the coating. The dried coating was a porous layer. A liquid containing a silicone resin and a cationic antistatic agent was applied on the back side of the polyester film opposite the porous layer and dried to form a stick preventing layer having a deposition amount of 0.05 $g/m^2$, thereby obtaining a heat-sensitive stencil A-1 according to the present invention.

EXAMPLE 2

The same composition as used in Example 1 was stirred to dissolve the resin in the solvent and allowed to quiescently stand to remove foams. The dispersion was then uniformly applied to a biaxially stretched polyester film (thickness: 3.5 μm) with a wire bar (diameter: 1.0 mm) at a temperature of 20° C. and a relative humidity of 50% with a coating rate of 10 m/minute, thereby to form a wet coating. Fine droplets of water were sprayed for 15 seconds from Humidiffer UV-107D (manufactured by Hitachi Inc.) over the surface of the wet coating placed at a distance 10 cm away from the Humidiffer. This was allowed to stand as such for 1 minute and then placed in a drying chamber at 50° C. for 2 minutes to dry the coating. The dried coating was a porous layer. A liquid containing a silicone resin and a cationic antistatic agent was applied and dried in the same manner as that in Example 1 to form a stick preventing layer, thereby obtaining a heat-sensitive stencil A-2 according to the present invention.

EXAMPLE 3

Example 1 was repeated in the same manner as described except that carbon fiber having a diameter of 16 μm and an average length of 30 μm to obtain a heat-sensitive stencil A-3 according to the present invention.

EXAMPLE 4

Example 1 was repeated in the same manner as described except that carbon fiber having a diameter of 16 μm and an average length of 10 mm to obtain a heat-sensitive stencil A-4 according to the present invention.

EXAMPLE 5

Example 1 was repeated in the same manner as described except that carbon fiber having a diameter of 16 μm and an average length of 7 mm to obtain a heat-sensitive stencil A-5 according to the present invention.

EXAMPLE 6

Example 1 was repeated in the same manner as described except that carbon fiber having a diameter of 4 μm and an average length of 30 μm to obtain a heat-sensitive stencil A-6 according to the present invention.

EXAMPLE 7

Example 1 was repeated in the same manner as described except that carbon fiber having a diameter of 3 μm and an average length of 50 μm to obtain a heat-sensitive stencil A-7 according to the present invention.

EXAMPLE 8

Example 1 was repeated in the same manner as described except that carbon fiber having a diameter of 25 μm and an average length of 50 μm to obtain a heat-sensitive stencil A-8 according to the present invention.

EXAMPLE 9

Cellulose acetate butylate 5 parts
Methyl ethyl ketone (b.p. 79.6° C.) 75 parts
Water 5 parts
Methanol (b.p. 64.5° C.) 5 parts The above composition was stirred to dissolve the resin in the solvent and allowed to quiescently stand to remove foams. The solution was then uniformly applied to a biaxially stretched polyester film (thickness: 3.5 μm) with a roll coater at a temperature of 30° C. and a relative humidity of 50% with a coating rate of 10 m/minute, thereby to form a wet coating. Then, 10 parts of carbon fiber having a diameter of 20 μm and an average length of 30 μm were scattered over the wet coating. The coating was allowed to stand as such for 1 minute and then placed in a drying chamber at 50° C. for 2 minutes to dry the coating. The dried coating was a porous layer. A liquid containing a silicone resin and a cationic antistatic agent was applied and dried in the same manner as that in Example 1 to form a stick preventing layer, thereby obtaining a heat-sensitive stencil A-9 according to the present invention.

Comparative Example 1

Example 1 was repeated in the same manner as described except that carbon fiber having a diameter of 16 μm and an average length of 12 mm to obtain a heat-sensitive stencil C-1 for comparative purposes.

Comparative Example 2

Example 1 was repeated in the same manner as described except that carbon fiber having a diameter of 16 μm and an average length of 20 μm to obtain a heat-sensitive stencil C-2 for comparative purposes.

Comparative Example 3

Example 1 was repeated in the same manner as described except that no carbon fiber was used to obtain a heat-sensitive stencil C-3 for comparative purposes.

Comparative Example 4

A biaxially stretched polyester film (thickness: 3.5 μm) similar to that used in Example 1 is laminated with a paper substrate to obtain a heat-sensitive stencil C-4 for comparative purposes. The paper substrate is the same as that of a commercially available stencil master, VT II Master (manufactured by Ricoh Company, Ltd.), which is recommended to be used in a commercially available printer (VT3820 manufactured by Ricoh Company Ltd.).

The porous layer of each of the heat-sensitive stencils A-1 to A-9 and C-1 to C-4 was measured for (a) average cell diameter, (b) percentage S1 of the total area of the openings having an equivalent diameter of at least 5 μm relative to a total area SA of the surface of the porous resin layer, (c) percentage S2 of the total area of the openings having an equivalent diameter of at least 5 μm relative to a total area $S_P$ of the openings, according to the following methods:

Average Cell Diameter

The cell diameters of cells are measured from an electron microphotograph (magnification: 1,000) of the surface of the porous layer 4. The photograph is processed by an image processor (LA-555D manufactured by Pierce Inc.) for determining the diameter of the circle corresponding to the cell diameter.

Percentages S1 and S2

As described above.

Each of the heat-sensitive stencils A-1 to A-9 and C-1 to C-4 was further measured for bonding strength, flexural rigidity, perforation sensitivity, print uniformity and ink stain. The test results are summarized in Table 2 and the test methods are shown below. The preparation of printing masters and mimeographic printing using same in these tests were carried out using a commercially available printer (VT3820 manufactured by Ricoh Company Ltd.) and an ink (VT600 II manufactured by Ricoh Company Ltd., viscosity at 20° C.: 153 poise).

TABLE 2

| Stencil | Average Diameter (μm) | Density (g/cm³) | S1 (%) | S2 (%) | Thickness of Stencil (μm) |
|---|---|---|---|---|---|
| A-1 | 12 | 0.8 | 60 | 93 | 31 |
| A-2 | 12 | 0.6 | 65 | 96 | 36 |
| A-3 | 12 | 0.9 | 58 | 95 | 35 |
| A-4 | 11 | 0.8 | 57 | 94 | 31 |
| A-5 | 10 | 0.9 | 57 | 98 | 35 |
| A-6 | 10 | 0.7 | 54 | 92 | 27 |
| A-7 | 10 | 0.8 | 68 | 94 | 28 |
| A-8 | 11 | 0.8 | 43 | 81 | 48 |
| A-9 | 12 | 0.8 | 60 | 93 | 31 |
| C-1 | 12 | 0.9 | 58 | 94 | 36 |
| C-2 | 11 | 0.7 | 57 | 96 | 35 |
| C-3 | 12 | 0.5 | 65 | 96 | 27 |
| C-4 | 12 | 0.5 | 65 | 98 | 52 |

Each of the heat-sensitive stencils A-1 to A-9 and C-1 to C-4 was further measured for (d) stiffness, (e) perforation sensitivity, (f) ink stain, (g) image density and (h) elongation according to the following method.

Stiffness

Stiffness is measured with Lorentzen Stiffness Tester. A stiffness of less than 5 mN is ill-suited for actual use.

Perforation Sensitivity

A sample stencil is subjected to perforation with a thermal head. Perforation sensitivity is evaluated according to the following ratings:

A: completely normally perforated
B: completely perforated but diameters are reduced
C: not completely perforated
D: hardly perforated Print Quality Prints obtained using sample stencils are compared with those obtained using a commercially available stencil (VT II Master manufactured by Ricoh Company Ltd.) with respect to absence of blurs and of density variation. Evaluation is made according to the following ratings:

A: superior
B: comparable
C: inferior

Ink Stain

Prints obtained using sample stencils are compared with those obtained using a commercially available stencil (VT II Master manufactured by Ricoh Company Ltd.) with respect to absence of ink stains on the rear side thereof. Evaluation is made according to the following ratings:

A: superior
B: comparable
C: inferior

Elongation

Sample stencil is used to obtain 1000 prints. Thereafter, the length of the stencil is compared with that before printing. Evaluation is made according to the following ratings:

A: no increase
B: slight increase
C: significant increase

The test results are summarized in Table 3.

TABLE 3

| Stencil | Stiffness (mN) | Perforation Sensitivity | Print Quality | Ink Stain | Elongation |
|---|---|---|---|---|---|
| A-1 | 121 | A | B | A | A |
| A-2 | 123 | A | B | A | A |
| A-3 | 111 | A | A | A | A |
| A-4 | 108 | A | A | A | A |
| A-5 | 120 | A | A | A | A |
| A-6 | 98 | A | A | A | A |
| A-7 | 75 | A | B | A | B |
| A-8 | 132 | B | B | A | A |
| A-9 | 121 | B | B | B | B |
| C-1 | 109 | B | C | A | A |
| C-2 | 113 | B | B | A | C |
| C-3 | 13 | A | B | A | C |
| C-4 | 131 | C | B | B | A |

EXAMPLE 10

Cellulose acetate butylate 5 parts
Methyl ethyl ketone (b.p. 79.6° C.) 75 parts
Water 5 parts
Methanol (b.p. 64.5° C.) 5 parts
Carbon fiber (diameter: 20 μm, average length: 10 mm) 10 parts The above composition was stirred to dissolve the resin in the solvent and allowed to quiescently stand to remove foams. The dispersion was then uniformly applied to a biaxially stretched polyester film (thickness: 3.5 μm) with a roll coater at a temperature of 30° C. and a relative humidity of 50% with a coating rate of 10 m/minute using a coating device as shown in FIG. 6, thereby to form a wet coating. The distance D between the tip end 11*a* of the blade 11 and the surface of the pickup roller 10 was 0.1 mm and the orientation angle θ of the blade 11 was 78.7 degrees. The coating liquid in the vessel 13 was recirculated at a rate of 2.5V per minute (V is a volume of the coating liquid). The coating was allowed to stand as such for 1 minute and then placed in a drying chamber at 50° C. for 2 minutes to dry the coating. The dried coating was a porous layer. A liquid containing a silicone resin and a cationic antistatic agent was applied on the back side of the polyester film opposite the porous layer and dried to form a stick preventing layer having a deposition amount of 0.05 $g/m^2$, thereby obtaining a heat-sensitive stencil A-10 according to the present invention.

EXAMPLE 11

Cellulose acetate butylate 10 parts
Methyl ethyl ketone (b.p. 79.6° C.) 72 parts
Water 4 parts
Methanol (b.p. 64.5° C.) 4 parts
Carbon fiber (diameter: 20 μm, average length: 10 mm) 10 parts Example 10 was repeated in the same manner as described except that the coating liquid had the above composition to obtain a heat-sensitive stencil A-11 according to the present invention.

EXAMPLE 12

Example 10 was repeated in the same manner as described except that the orientation angle θ of the blade 11 was 45 degrees to obtain a heat-sensitive stencil A-12 according to the present invention.

Comparative Example 5

Example 10 was repeated in the same manner as described except that the carbon fiber used had an average length of 12 mm to obtain a heat-sensitive stencil C-5 for comparative purposes.

EXAMPLE 13

Cellulose acetate butylate 3 parts
Methyl ethyl ketone (b.p. 79.6° C.) 76 parts
Water 5 parts
Methanol (b.p. 64.5° C.) 6 parts
Carbon fiber (diameter: 20 μm, average length: 10 mm) 10 parts Example 10 was repeated in the same manner as described except that the coating liquid had the above composition to obtain a heat-sensitive stencil A-13 according to the present invention.

EXAMPLE 14

Cellulose acetate butylate 11 parts
Methyl ethyl ketone (b.p. 79.6° C.) 71 parts
Water 4 parts
Methanol (b.p. 64.5° C.) 4 parts
Carbon fiber (diameter: 20 μm, average length: 10 mm) 10 parts Example 10 was repeated in the same manner as described except that the coating liquid had the above composition to obtain a heat-sensitive stencil A-14 according to the present invention.

EXAMPLE 15

Example 10 was repeated in the same manner as described except that the orientation angle θ of the blade 11 was 39.8 degrees to obtain a heat-sensitive stencil A-15 according to the present invention.

EXAMPLE 16

Example 10 was repeated in the same manner as described except that the orientation angle θ of the blade 11 was 84.3 degrees to obtain a heat-sensitive stencil A-16 according to the present invention.

Each of the thus obtained Stencils A-10 to A-16 and C-5 was tested for the print quality. The results are shown in Table 4. Also shown in Table 4 are the results of the evaluation of the coating efficiency which is rated as follows:

A: excellent
B: filler fibers are not completely uniform
C: filler fibers are aggregated in part
D: gap between the tip of the blade and the surface of the pickup roll is clogged with the filler

TABLE 4

| Stencil | Length of Filler (mm) | Viscosity of Coating Liquid (cP)* | Angle θ (°) | Coating Efficiency | Print Quality |
|---|---|---|---|---|---|
| A-10 | 10 | 80 | 78.7 | B | A |
| A-11 | 10 | 250 | 78.7 | A | A |
| A-12 | 10 | 80 | 45 | B | A |
| A-13 | 10 | 70 | 78.7 | C | B |
| A-14 | 10 | 280 | 78.7 | A | B |
| A-15 | 10 | 80 | 39.8 | C | B |
| A-16 | 10 | 80 | 84.3 | C | B |
| C-5 | 12 | 80 | 78.7 | D | C |

*: measured at 25° C. with Viscosity Cup V-1 (manufactured by Meiji Kikai Seisakusho Co., Ltd.)

EXAMPLE 17

Example 11 was repeated in the same manner as described except that the recirculation rate of the coating liquid was 3V per minute to obtain a heat-sensitive stencil A-17 according to the present invention.

EXAMPLE 18

Example 11 was repeated in the same manner as described except that the recirculation rate of the coating liquid was 2V per minute to obtain a heat-sensitive stencil A-18 according to the present invention.

EXAMPLE 19

Example 10 was repeated in the same manner as described except that the recirculation rate of the coating liquid was 1.5V per minute and that the filler fiber had an average length of 8 mm to obtain a heat-sensitive stencil A-19 according to the present invention.

EXAMPLE 20

Example 11 was repeated in the same manner as described except that the recirculation rate of the coating liquid was 1.8V per minute to obtain a heat-sensitive stencil A-20 according to the present invention.

Each of the thus obtained Stencils A-17 to A-20 was tested for the coating efficiency. The results are shown in Table 5. The evaluation is rated as follows:
A: excellent
B: filler fibers are not completely uniform
C: filler fibers are aggregated in part
D: gap between the tip of the blade and the surface of the pickup roll is clogged with the filler

TABLE 5

| Stencil | Length of Filler (mm) | Viscosity of Coating Liquid (cP) | Recirculation Rate (V/minute) | Coating Efficiency |
|---|---|---|---|---|
| A-17 | 10 | 250 | 3 | A |
| A-11 | 10 | 250 | 2.5 | A |
| A-18 | 10 | 250 | 2 | B |
| A-19 | 8 | 80 | 1.5 | C |
| A-20 | 10 | 250 | 1.8 | C |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A heat-sensitive stencil comprising a thermoplastic resin film having a thickness of 0.5–10 μm, and a porous resin layer formed thereon and having a thickness of 5–100 μm, said porous resin layer including resin walls defining cells, and fibers dispersed in said porous resin layer and supported only by said resin walls, said fibers having an average length in the range of 30 μm to 10 mm.

2. A heat-sensitive stencil as claimed in claim 1, wherein said fibers have an average diameter in the range of 4 μm to 20 μm.

3. A heat-sensitive stencil as claimed in claim 1, wherein said porous resin layer has pores exposed to a surface thereof to form a multiplicity of openings, wherein the total area of said openings having an equivalent diameter of at least 5 μm is 4–80% of a total area of said surface of said porous resin layer, said equivalent diameter being defined as a diameter of a circle having the same area as that of the corresponding opening.

4. A heat-sensitive stencil as claimed in claim 1, wherein said porous resin layer has pores exposed to a surface thereof to form a multiplicity of openings, wherein the total area of said openings having an equivalent diameter of at least 5 μm is at least 50% of a total area of said openings, said equivalent diameter being defined as a diameter of a circle having the same area as that of the corresponding opening.

5. A heat-sensitive stencil as claimed in claim 1, and having an air permeability in the range of 1.0 $cm^3/cm^2$.sec to 157 $cm^3/cm^2$.sec in a portion thereof when said thermoplastic resin film of said portion is perforated to form perforations providing an open ratio $S_O/S_P$ of at least 0.2, wherein $S_O$ represents a total area of said perforations and $S_P$ represents the area of said portion.

6. A heat sensitive stencil as claimed in claim 5, wherein said porous resin layer has such a thickness that, when said thermoplastic resin film is perforated to form perforations providing an open ratio $S_O/S_P$, where $S_O$ and $S_P$ are as defined above, of 0.2–0.8, at least part of said porous resin layer in each of said perforations remains unperforated.

7. A heat sensitive stencil as claimed in claim 5, wherein said fibers are carbon fibers.

8. A method of preparing a heat-sensitive stencil according to claim 1, comprising the steps of:

(a) applying a coating liquid over a surface of a thermoplastic resin film to form a coated layer, said coating liquid having a viscosity of 80–250 cp at 25° C.. and containing a resin and fibers having an average length in the range of 30 μm to 10 mm; and (b) drying said coated layer.

9. A method as claimed in claim 8, wherein step (a) comprises the sub-steps of:

picking up said coating liquid contained in a vessel to a rotating pickup roll, passing said picked-up coating liquid through a gap defined between said pickup roll and a blade to form a film of said coating liquid having a predetermined thickness, and transferring said coating liquid film to said surface of said thermoplastic resin film.

10. A method as claimed in claim 9, wherein said gap is at least twice the diameter of said fibers but not greater than 1 mm and wherein said blade is oriented such that the angle θ between the inside surface of said blade and the radial plane passing the center axis of said pickup roll and the tip of said blade is in the range of 45 to 90 degrees.

11. A method as claimed in claim 9, wherein said coating liquid in said vessel is continuously flowing at a rate of at least V per minute where V is the volume of said coating liquid in said vessel.

* * * * *